US009486006B2

(12) United States Patent
Kelleher et al.

(10) Patent No.: US 9,486,006 B2
(45) Date of Patent: *Nov. 8, 2016

(54) PROTEIN PRODUCT AND PROCESS FOR PREPARING INJECTABLE PROTEIN PRODUCT

(71) Applicant: Proteus Industries, Inc., Gloucester, MA (US)

(72) Inventors: Stephen D Kelleher, Ipswich, MA (US); William R. Fielding, Hilton Head, SC (US); Wayne S. Saunders, Gloucester, MA (US); Peter G. Williamson, Gloucester, MA (US)

(73) Assignee: Proteus Industries, Inc., Gloucester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/039,559

(22) Filed: Sep. 27, 2013

(65) Prior Publication Data

US 2014/0023759 A1 Jan. 23, 2014

Related U.S. Application Data

(63) Continuation of application No. 12/924,382, filed on Sep. 27, 2010, now abandoned, which is a continuation-in-part of application No. 12/798,423, filed on Apr. 5, 2010.

(51) Int. Cl.

| A23J 1/02 | (2006.01) |
|---|---|
| A23L 1/318 | (2006.01) |
| A23J 1/04 | (2006.01) |
| A23L 1/314 | (2006.01) |
| A23L 1/315 | (2006.01) |
| A23L 1/317 | (2006.01) |
| A23L 1/32 | (2006.01) |

(52) U.S. Cl.
CPC ............... *A23L 1/3182* (2013.01); *A23J 1/02* (2013.01); *A23J 1/04* (2013.01); *A23L 1/3152* (2013.01); *A23L 1/3155* (2013.01); *A23L 1/3175* (2013.01); *A23L 1/31409* (2013.01); *A23L 1/31427* (2013.01); *A23L 1/31445* (2013.01); *A23L 1/3204* (2013.01)

(58) Field of Classification Search
CPC ......... A23J 1/02; A23J 1/04; A23L 1/31409; A23L 1/31427; A23L 1/31445; A23L 1/3155; A23L 1/3175; A23L 1/3182; A23L 1/3204; A23L 1/3152

USPC ......... 530/350, 412; 426/281, 442, 657, 656
See application file for complete search history.

(56) References Cited

U.S. PATENT DOCUMENTS

| 2,282,801 A | 5/1942 | Musher |
|---|---|---|
| 2,470,281 A | 5/1949 | Allingham |
| 3,406,081 A | 10/1968 | Bauer et al. |
| 3,451,826 A | 6/1969 | Mulder |
| 4,031,261 A | 6/1977 | Durst |
| 4,935,251 A | 6/1990 | Verhoef et al. |
| 6,005,073 A | 12/1999 | Hultin et al. |
| 6,136,959 A | 10/2000 | Hultin et al. |
| 6,288,216 B1 | 9/2001 | Hultin et al. |
| 6,451,975 B1 | 9/2002 | Hultin et al. |
| 6,855,364 B2 | 2/2005 | Kelleher et al. |
| 7,163,707 B2 | 1/2007 | Kelleher et al. |
| 7,473,764 B2 | 1/2009 | Hultin et al. |
| 7,556,835 B2 | 7/2009 | Hultin et al. |
| 2004/0058035 A1 | 3/2004 | Kelleher et al. |
| 2004/0067551 A1 | 4/2004 | Hultin et al. |
| 2004/0224079 A1 | 11/2004 | Kelleher |
| 2005/0064085 A1 | 3/2005 | Kelleher et al. |
| 2005/0233060 A1 | 10/2005 | Kelleher |
| 2009/0269440 A1 | 10/2009 | Hardin |
| 2011/0244092 A1 | 10/2011 | Kelleher et al. |
| 2011/0244093 A1 | 10/2011 | Kelleher et al. |

FOREIGN PATENT DOCUMENTS

| EP | 0848911 A2 | 6/1998 |
|---|---|---|
| GB | 2097646 A | 11/1982 |
| WO | WO 2004/028280 | 4/2004 |

OTHER PUBLICATIONS

Meinke et al, Some Factors Influencing the Production of Protein Isolates From Whole Fish, 1972, Journal of Food Science, vol. 37, pp. 195-198.
Omana D. A. et al., "Alkali-aided Protein Extraction from Chicken Dark Meat: Chemical and Functional Properties of Recovered Proteins," *Process Biochemistry*, 45:375-381 (2010).

*Primary Examiner* — Vera Stulii
(74) *Attorney, Agent, or Firm* — Antoinette G. Giugliano; AGG Intellectual Property Law

(57) ABSTRACT

Moisture is retained in cooked or thawed food by adding to the food an aqueous suspension of animal muscle protein obtained from animal muscle tissue. The aqueous suspension is obtained by mixing comminuted animal muscle tissue with a food grade base to form an aqueous basic solution of animal muscle protein. The basic solution is mixed with a food grade acid to precipitate the protein in an aqueous composition. The precipitated protein then is comminuted to form an aqueous suspension of comminuted animal muscle protein.

19 Claims, 5 Drawing Sheets

CLOGGING

CLOGGING

PROTEIN PRODUCT AND PROCESS FOR PREPARING INJECTABLE PROTEIN PRODUCT

REFERENCE TO RELATED APPLICATION

Figure 1:
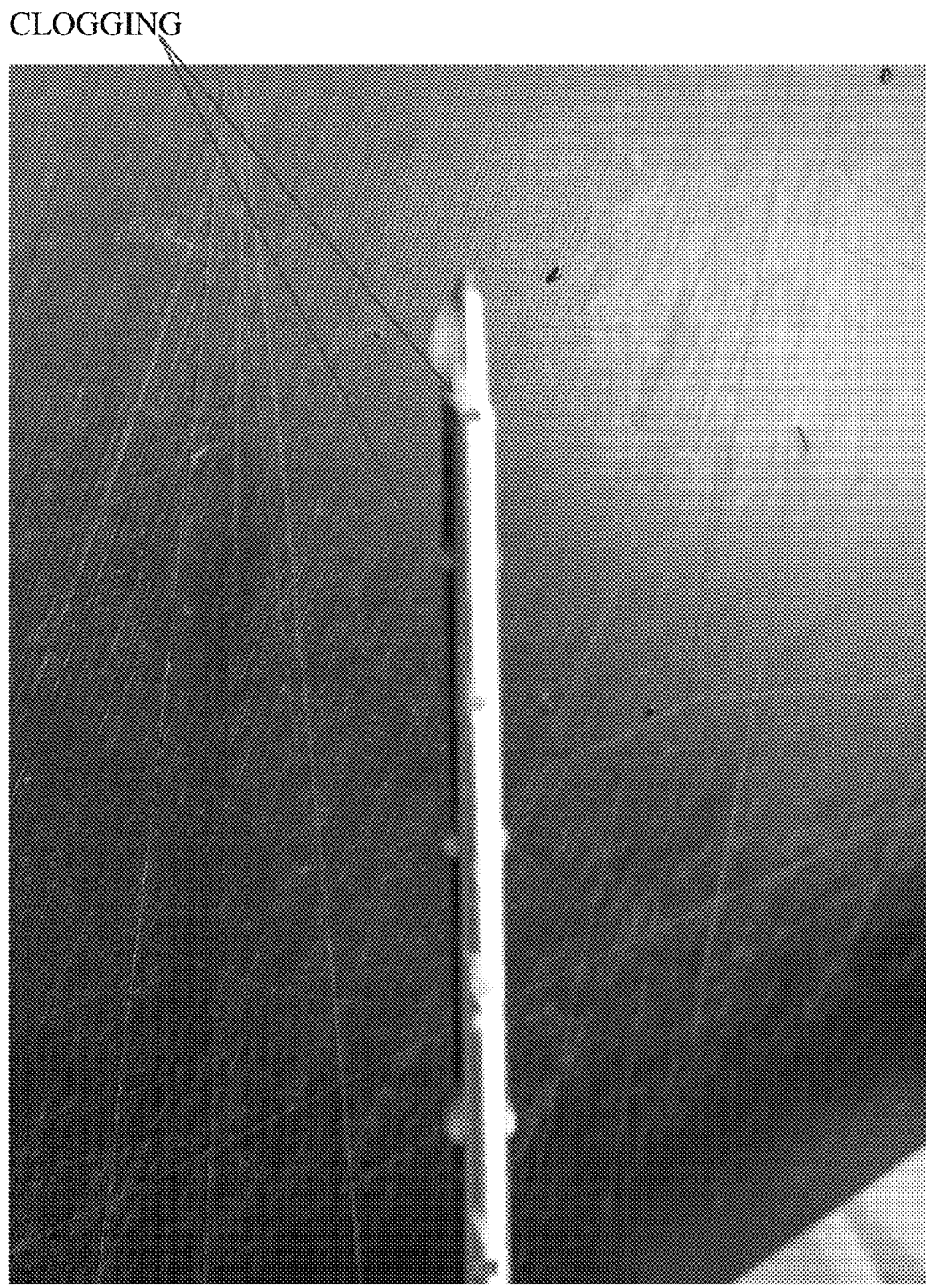
Figure 2:
Figure 3:
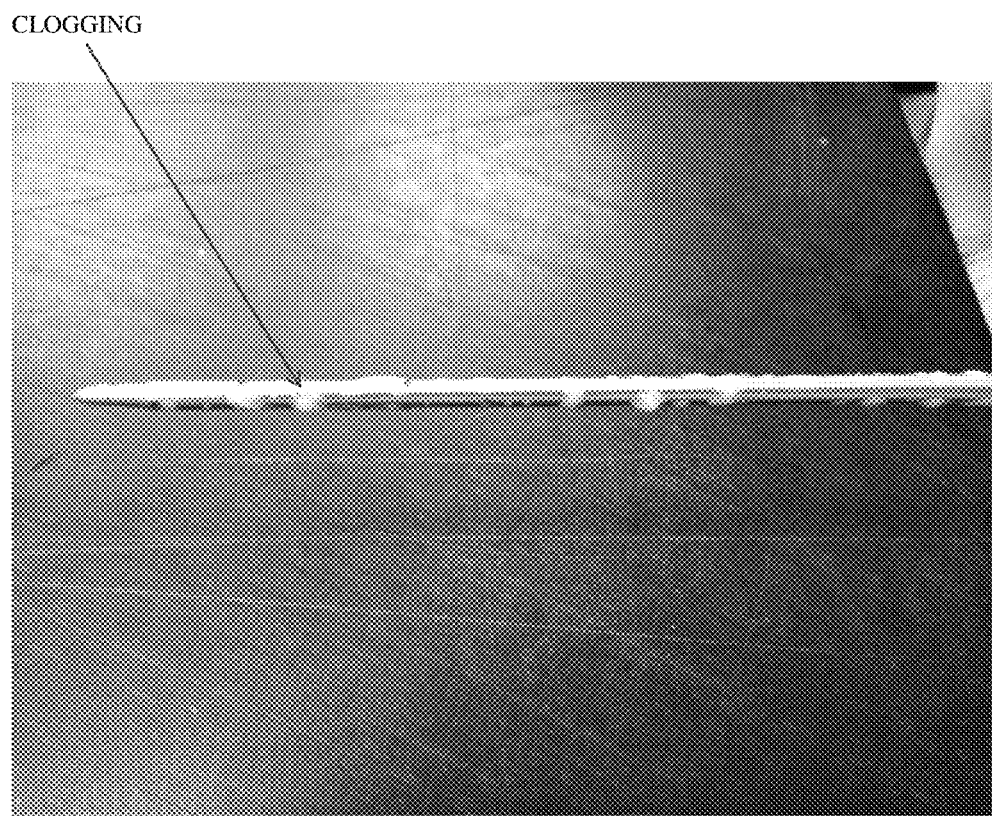
Figure 4:
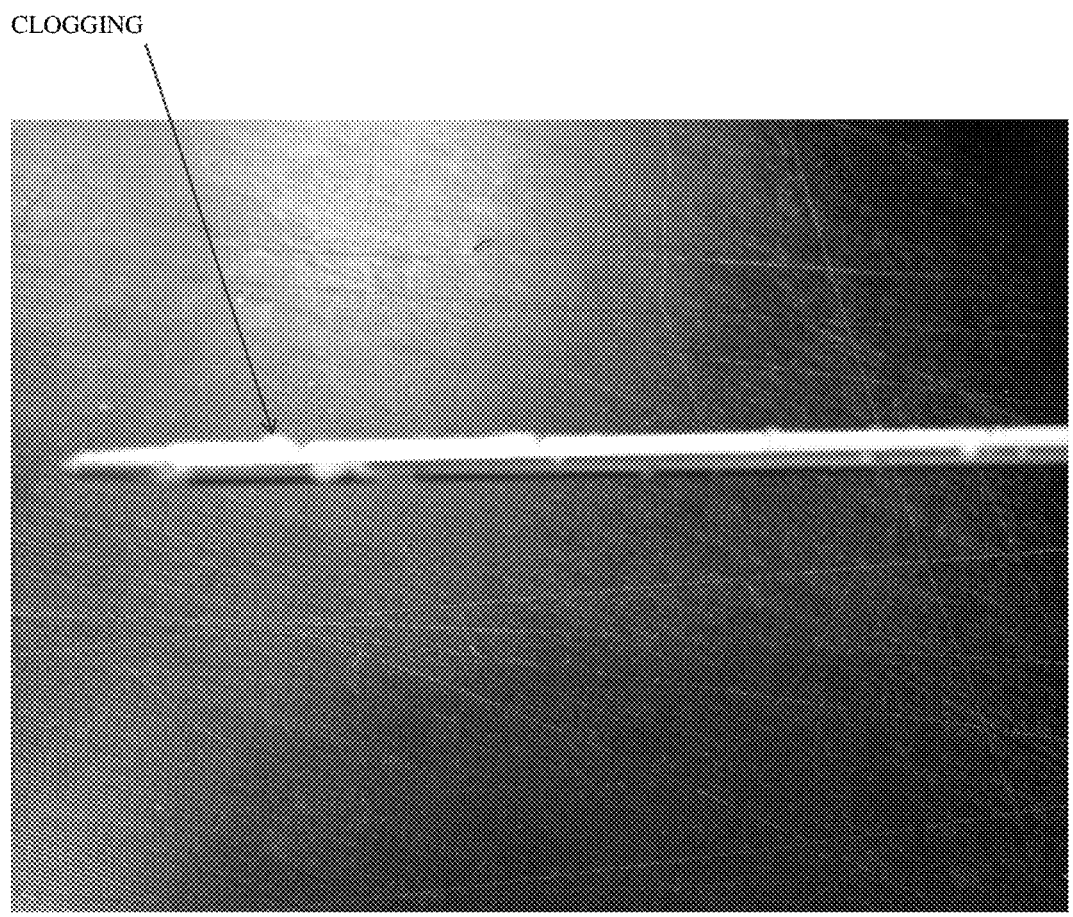
Figure 5:

This application is a continuation of co-pending application Ser. No. 12/924,382 filed Sep. 27, 2010 which application is a continuation-in-part of co-pending application Ser. No. 12/798,423, filed Apr. 5, 2010.

BACKGROUND OF THE INVENTION

This invention relates to a novel protein composition derived from animal muscle tissue, a process for making the protein composition and to a process for retaining moisture in food, cooked or uncooked.

At the present time, it is desirable to retain moisture in cooked or uncooked food so that drying of the food during the cooking process is minimized. It is also desirable to retain moisture in cooked or uncooked food so that the natural food flavors are retained in the food even after cooking.

A common occurrence of moisture loss occurs when a frozen food is thawed such as prior to cooking the food. The thawed food experiences drip loss wherein a liquid aqueous composition such as water is formed and becomes separated from the solid thawed food.

A second common occurrence of moisture loss occurs when an uncooked food is cooked. Liquid moisture in the food becomes vaporized during the cooking process and migrates to the food surface where it evaporates or separates as a liquid from the solid food being cooked.

At the present time, a variety of additive compositions are added to food, primarily by injection, by vacuum tumbling and/or with syringes. Prior attempts to retain moisture in cooked meat or fish with additives have included the use of sodium tripolyphosphate, starches, vegetable fibers, a coating of fat free flour based batter containing an egg white substitute (U.K. Patent Application 2,097,646), water-in-oil emulsion (U.S. Pat. No. 3,406,081), protein or protein isolate and a fat (U.S. Pat. Nos. 4,031,261 and 4,935,251), milk solids (U.S. Pat. No. 2,282,801) and lecithin (U.S. Pat. Nos. 2,470,281 and 3,451,826).

An example of such a composition also is disclosed in U.S. Pat. No. 6,855,364 wherein an acidic protein composition derived from animal muscle tissue is added to a food prior to cooking in order to retain moisture in the food during cooking. The acidic protein composition is one obtained by mixing a food grade acid composition with comminuted animal muscle tissue to obtain an acidic protein composition. Suitable processes for obtaining the acidic protein composition are disclosed in U.S. Pat. Nos. 6,005, 073; 6,288,216; 6,451,975 and/or 7,473,764 all of which are incorporated herein by reference in their entirety. U.S. Pat. Nos. 6,136,959 and 7,556,835 disclose processes for solubilizing animal muscle tissue with an alkaline composition which are incorporated herein by reference in their entirety.

Accordingly, it would be desirable to provide a form of fish or meat which can be thawed and/or cooked while retaining its moisture and natural flavors or added flavors. In addition, it would be desirable to provide such a form of fish or meat wherein the majority of moisture or added flavors in the uncooked fish or meat is retained during cooking.

SUMMARY OF THE INVENTION

In accordance with this invention, it has been found that a novel animal muscle protein composition comprising sarcoplasmic proteins and myofibrillar proteins derived from animal muscle tissue provide improved moisture retention in food being thawed or cooked. The animal muscle protein composition is obtained from animal muscle tissue by comminuting the animal muscle tissue and then mixing it with a food grade alkaline composition under conditions to solubilize the animal muscle protein thereby forming a solution of animal muscle protein. The solubilized basic animal muscle tissue then is mixed with a food grade acid composition to decrease the pH of the solubilized animal muscle protein to a pH between about 4.7 and about 11.0, preferably between about pH 5.5 and about 9.5, thereby to precipitate the protein. The precipitated protein then is comminuted to form protein particulates suspended in an aqueous medium. It has been found that when the animal muscle protein composition prepared by the process of this invention is added to a food to be thawed and/or cooked, increased moisture retention in the food is observed as compared to an acidic animal muscle tissue protein composition or an alkaline animal muscle tissue protein composition obtained without the first step of forming a basic animal muscle composition formed from animal muscle tissue.

This result is surprising since the protein compositions are chemically the same. While applicants do not wish to be bound to any theory explaining this surprising result, it is believed that by first mixing the animal muscle tissue with a food grade base, unfolding or expanding of the protein molecules is promoted and the subsequent mixing of the protein with a food grade acid compound results in an increase in functionality of the protein. This increase in functionality promotes increased moisture retention in the food being treated with the protein.

In addition, it has been found that the comminuted animal muscle protein composition of this invention can be injected into food when pumped through a syringe while avoiding protein precipitation within the syringe which blocks the fluid pathway through the syringe. In contrast, it has been found that when the precipitated protein which has been mixed first with a base and then with an acid but is not comminuted blocks the fluid pathway of a syringe within seconds after pumping of the protein composition is initiated. In addition, it has also been found that when the precipitated protein which has been mixed first with a base and then with an acid and additionally mixed with salt, for flavoring, and then comminuted does not block the fluid pathway of the syringe. This is not true for proteins held at the low pH or proteins that go directly to high pH in contrast to proteins that are adjusted to high pH prior to adjustment to a low pH. Also, in contrast to the composition of this invention, animal muscle tissue which has been solubilized with an alkaline composition to form basic animal muscle protein which is comminuted or not comminuted blocks the fluid pathway of a syringe within seconds after initiating pumping through the syringe. The fact that these protein compositions block the fluid pathway through the syringe renders them useless for injecting a food with a syringe. In addition, the protein composition mixed first with a base and then with an acid and not comminuted or is mixed only with a base and comminuted or not comminuted can not be adequately injected into a food by vacuum tumbling since they are retained on the surface of the food and do not satisfactorily penetrate the food surface.

The animal muscle protein composition of this invention can be derived from any form of animal muscle tissue including that obtained from fish, poultry such as chicken, shellfish such as shrimp, lamb, beef, pork or the like.

When moisture is to be retained in food to be thawed and/or food to be cooked, the protein composition of this invention is first added to the food including mixing the protein composition with the food or injecting the protein composition into the food such as by vacuum tumbling and/or with a syringe.

DESCRIPTION OF SPECIFIC EMBODIMENTS

In accordance with this invention, in a first step, the basic muscle tissue protein comprising sarcoplasmic proteins and myofibrillar proteins is formed by comminuting animal muscle tissue and then mixing the comminuted animal muscle tissue with a food grade alkaline composition under conditions to solubilize the animal muscle tissue. Sufficient water also is added to the tissue to fully disperse it. The water and alkaline composition can be added in sequence or added together with the tissue. The resultant basic animal muscle tissue protein solution has a pH of about 10.5 or greater, preferably between about 11.0 and about 12.5, most preferably between about 11.5 and about 12.0 but not so high as to adversely affect the protein functionality.

Any food grade or pharmaceutically acceptable base that does not undesirably contaminate the basic protein product can be used to raise the pH of the protein product. For example, representative suitable alkaline compositions include sodium hydroxide, potassium hydroxide, sodium bicarbonate, potassium bicarbonate or mixtures thereof or the like. The animal muscle tissue is formed into small tissue particles which are then mixed with sufficient base to form a solution of the tissue having a pH of 10.5 or higher, but not such a high pH as to adversely modify the animal muscle tissue protein. In one process, the solution is centrifuged to form a lowest membrane lipid layer, an intermediate layer of aqueous basic protein solution and a top layer of neutral lipids (fats and oils). The intermediate layer of aqueous alkaline protein solution then is separated from the membrane lipid layer or from both the membrane lipid layer and the neutral lipid layer. In a second process, no centrifugation step is effected since the starting animal muscle tissue contains sufficiently low concentrations of undesired membrane lipids, oils and/or fats as to render a centrifugation step unnecessary. In both processes, the protein composition formed is free of myofibrils and sarcomeres.

The basic animal muscle protein solution then is mixed with a food grade or pharmaceutically acceptable acid composition to lower the pH of the basic solution to a pH of between about 4.7 and about 11.0, preferably between about 5.5 and about 9.5 to precipitate the animal muscle protein. Representative suitable organic acids include citric acid, ascorbic acid, malic acid or tartaric acid or mineral acids such as hydrochloric acid, phosphoric acid, sulfuric acid or mixtures thereof. The precipitated animal muscle protein then is comminuted into fine particles such as with apparatus having one or more rotating blades or one or more reciprocating blades thereby to form an aqueous suspension of animal muscle proteins.

The aqueous suspension of animal muscle protein is admixed with comminuted meat or whole fish, fish fillets, whole pieces of meat or injected into meat or fish. Injection can be effected in any manner such as with a syringe or by vacuum tumbling or both. It has been found that when the resultant meat or fish is thawed or the resultant meat or fish is cooked, the thawed or cooked meat or fish retains significantly greater moisture as compared to meat or fish not containing the protein composition of this invention.

The protein products utilized in the present invention comprise primarily myofibrillar proteins that also contain significant amounts of sarcoplasmic proteins. The sarcoplasmic proteins in the protein product admixed with or injected into the animal muscle tissue comprises above about 8%, preferably above about 10%, more preferably above about 18%, up to about 30% by weight sarcoplasmic proteins, based on the total weight of protein.

In one aspect of this invention, particulate meat or fish such as ground meat or fish, e.g., hamburger, is mixed with the protein suspension comprising myofibrillar proteins and sarcoplasmic proteins at a weight ratio usually comprising about 0.03 to about 18% weight of the protein mixture based on the weight of the uncooked meat or fish, preferably between about 0.5 and 10% weight based on the weight of uncooked meat or fish and most preferably comprising between about 0.5 to about 5% weight based on the weight of the uncooked meat of fish. When utilizing less than about 0.3% weight of the protein suspension of this invention, effective moisture retention is not observed.

The animal muscle tissue which is modified to retain moisture in accordance with this invention comprises meat and fish, including shell fish. Representative suitable fish include deboned flounder, sole, haddock, cod, sea bass, salmon, tuna, trout or the like. Representative suitable shell fish include shrimp, crabmeat, crayfish, lobster, scallops, oysters, or shrimp in the shell or the like. Representative suitable meats include ham, beef, lamb, pork, venison, veal, buffalo or the like; poultry such as chicken, mechanically deboned poultry meat, turkey, duck, goose or the like either in fillet form or in ground form such as hamburger. The meats can include the bone of the animal when the bone does not adversely affect the edibility of the meat such as spare ribs, lamb chops or pork chops. In addition, processed meat products which include animal muscle tissue such as a sausage composition, a hot dog composition, emulsified product or the like can be injected or mixed with the protein suspension of this invention or a combination of these protein addition methods. Sausage and hot dog compositions include ground meat or fish, herbs such as sage, spices, sugar, pepper, salt and fillers such as dairy products as is well known in the art.

The fish or meat containing the protein suspension of this invention then can be cooked in a conventional manner such as by baking, broiling, deep fat frying, in a microwave oven or the like. It has been found that the cooked meat or fish provided in accordance with this invention weighs between about 1 and about 20%, more usually between about 4% and about 9% by weight greater than cooked untreated meat or fish starting from the same uncooked weight. In addition, when frozen meat or fish containing the protein suspension is that drip loss from the food is reduced between about 4 and about 15% as compared with meat or fish not containing the protein suspension of this invention.

The following example illustrates the present invention and is not intended to limit the same.

EXAMPLE 1

This example illustrates that the protein composition made by the method of this invention provides an improved increase in moisture retention in fish or shellfish as compared to acidic basic protein composition not mixed with an acid composition. The basic protein compositions shown in Table 1 were processed by mixing comminuted fish muscle protein with a food grade alkaline composition comprising sodium hydroxide to obtain a protein solution having a pH of 12.0. The protein composition of this invention were obtained by mixing comminuted chicken muscle protein with a food grade alkaline composition comprising sodium hydroxide to obtain a pH of 12.0 in a first step. In a second step, a food grade acid composition comprising 2 M hydrochloric acid was added to the basic protein solution to precipitate the protein having a pH of 4.7 The precipitated protein in each instance was comminuted with a Stephan micro-cut apparatus having two rotating blades to form a suspension of protein and an aqueous medium having pH values shown in Table 1. Additional adjustments in pH above pH 4.7 as shown in Table 1 were accomplished using sodium hydroxide. The protein composition made from muscle protein as described herein was injected into the chicken muscle tissue and placed into a vacuum tumbler for 20 minutes with a vacuum of 24-24 mm Hg. The injected animal muscle tissue was then allowed to settle for 20 minutes prior to determining pick-up weights. The control injection marinade was a solution of salt (2.0%), sodium tripolyphosphate (3.0%) and cold water (95%). This phosphate/brine solution is standard in the industry. All injected product was baked in a convection oven until an internal temperature of 165° F. was achieved. The animal muscle tissue samples were weighed prior to injection, subsequent to injection and subsequently to being baked.

As shown in Table 1, moisture retention as pick-up and cook yields were improved with the with the protein compositions of this invention when compared to the STPP/Brine controls and the alkaline adjusted (pH 12) protein with no further pH adjustments.

TABLE 1

Injection Retention and Cook Losses for Chicken Breasts

| INJECTION & TUMBLE | Muscle Type | Pre-Injection/Tumble (Green) Weight (g) | Post-Injection/Tumble Weight (g) | Pick-up Weight (g) | Pick-up |
|---|---|---|---|---|---|
| Control (STPP/Salt) | Chicken | 334.00 | 377.00 | 43.00 | 12.87% |
| pH 12 | Chicken | 713.24 | 806.81 | 93.57 | 13.12% |
| pH 12 → pH 4.7 | Chicken | 578.54 | 658.45 | 79.91 | 13.81% |
| pH 12 → pH 7.5 | Chicken | 562.38 | 643.11 | 80.73 | 14.36% |

| COOK | Muscle Type | Pre-Cook Weight (g) | Post-Cook Weight (g) | Cook Loss (g) | Cook Loss |
|---|---|---|---|---|---|
| Control (STPP/Salt) | Chicken | 377.00 | 270.00 | 107.00 | 28.38% |
| pH 12 | Chicken | 256.92 | 185.42 | 71.50 | 27.83% |
| pH 12 → pH 4.7 | Chicken | 327.10 | 245.06 | 82.04 | 25.08% |
| pH 12 → pH 7.5 | Chicken | 288.08 | 212.60 | 75.48 | 26.20% |

The invention claimed is:

1. A process for retaining moisture in animal muscle tissue which comprises:
   A) adding an injectable salted aqueous suspension of functional animal muscle tissue protein composition to said animal muscle tissue at a weight ratio between about 0.03% and about 18% by weight of the injectable salted aqueous suspension of functional animal muscle tissue composition to said animal muscle tissue, whereby said injectable salted aqueous suspension of functional animal muscle tissue protein composition is injected into said animal muscle, and
   B) cooking or thawing said animal muscle tissue with said injectable salted aqueous suspension of functional animal muscle tissue protein composition from step A) wherein, after cooking, the animal muscle tissue weighs between about 1% and about 20% greater than an animal muscle tissue not subjected to step A), and wherein, after thawing, the animal muscle tissue weighs between about 4% and about 15% greater than an animal muscle tissue not subjected to step A);
   wherein the injectable salted aqueous suspension of functional animal muscle tissue protein composition is for use during a food processing injection procedure with at least one injection pathway, and wherein said salted aqueous suspension of functional animal muscle tissue comprises sarcoplasmic proteins and myofibrillar proteins derived from animal muscle tissue and is obtained by the process comprising the steps of:
   1) comminuting animal muscle tissue to form comminuted animal muscle tissue,
   2) mixing said comminuted animal muscle tissue with a food grade alkaline composition to solubilize animal muscle protein thereby forming an aqueous basic solution of animal muscle protein having a pH between about 10.5 and about 12.5, wherein step 1) and step 2) are performed simultaneously or in order,
   3) then mixing said aqueous basic solution with a food grade acid composition to precipitate the animal muscle protein in solution to form an aqueous suspension of animal muscle protein particulates having a pH between about 4.7 and about 9.5 wherein steps 2) and 3) are performed without addition of salt apart from the food grade alkaline composition added in step 2) and the food grade acid composition added in step 3),
   4) then adding salt apart from the food grade alkaline composition of step 2) and the food grade acid composition of step 3) to said aqueous suspension of step 3) to form a salted aqueous suspension of animal muscle protein, and
   5) then comminuting said salted aqueous suspension of step 4) of animal muscle protein to form the injectable salted aqueous suspension of functional animal muscle tissue protein composition including sarcoplasmic proteins and myofibrillar proteins;
   whereby said injectable salted aqueous suspension is flowable through the at least one injection pathway during an injection procedure without blocking the at least one injection pathway.

2. The process of claim 1 wherein the injection of the salted aqueous suspension of functional animal muscle tissue protein composition is followed by vacuum tumbling.

3. The process of claim 1 wherein the pH of the aqueous basic solution is between about 11.0 and about 12.5.

4. The process of claim 1 wherein the pH of the aqueous suspension of animal muscle protein is between about 5.5 and 9.5.

5. The process of claim 1 wherein the salt added during step 4) is sodium chloride.

6. The process of claim 1 wherein said food grade acid composition is citric acid and said food grade alkaline composition is sodium bicarbonate.

7. The process of claim 1 wherein the animal muscle tissue is taken from the group consisting of:
   i) fish animal muscle tissue,
   ii) shellfish animal muscle tissue including shrimp animal muscle tissue,
   iii) poultry animal muscle tissue including chicken animal muscle tissue and turkey animal muscle tissue, and iv) meat animal muscle tissue including beef animal muscle tissue, pork animal muscle tissue and lamb animal muscle tissue.

8. The process of claim 7 wherein the salt added during step 4) is sodium chloride.

9. The process of claim 7 wherein said food grade acid composition is citric acid and said food grade alkaline composition is sodium bicarbonate.

10. The process for injecting an injectable salted aqueous suspension of functional animal muscle tissue protein composition for use during a food processing injection procedure with at least one injection pathway wherein the injectable salted aqueous suspension of functional animal muscle tissue comprises sarcoplasmic proteins and myofibrillar proteins , said process comprising:
   A) comminuting animal muscle tissue to form comminuted animal muscle tissue,
   B) mixing said comminuted animal muscle tissue with a food grade alkaline composition to solubilize animal muscle protein thereby forming an aqueous basic solution of animal muscle protein having a pH between about 11.5 and about 12.0 wherein step A) and step B) are performed simultaneously or in order,
   C) then mixing said aqueous basic solution of animal muscle protein with a food grade acid composition to form an aqueous suspension of animal muscle protein particulates having a pH between about 4.7 and about 9.5, wherein steps B) and C) are performed without addition of salt apart from the food grade alkaline composition added in step B) and the food grade acid composition added in step C),
   D) then adding salt apart from the food grade alkaline composition of step B) and the food grade acid composition of step C) to the aqueous solution of step C) to form a salted aqueous suspension of animal muscle protein,
   E) then comminuting said salted aqueous suspension of step D) of animal muscle protein hereby to form the injectable salted aqueous suspension of functional animal muscle tissue protein composition including sarcoplasmic proteins and myofibrillar proteins; and
   F) injecting said comminuted salted aqueous suspension through the at least one injection pathway;
   wherein said injectable salted aqueous suspension does not block the at least one injection pathway.

11. The process of claim 10 wherein membrane lipids are separated from said aqueous basic solution of animal muscle tissue protein.

12. The process of claim 10 wherein the salt added during step D) is sodium chloride.

13. The process of claim 12 wherein said food grade acid composition is citric acid and said food grade alkaline composition is sodium bicarbonate.

14. The process of claim 10 wherein the animal muscle tissue is taken from the group consisting of:
   i) fish animal muscle tissue,
   ii) shellfish animal muscle tissue including shrimp animal muscle tissue,
   iii) poultry animal muscle tissue including chicken animal muscle tissue and turkey animal muscle tissue, and
   iv) meat animal muscle tissue including beef animal muscle tissue, pork animal muscle tissue and lamb animal muscle tissue.

15. The process of claim 14 wherein the salt added during step D) is sodium chloride.

16. The process of claim 14 as wherein said food grade acid composition is citric acid and said food grade alkaline composition is sodium bicarbonate.

17. The process of claim 10 wherein the pH of the aqueous suspension of animal muscle protein is between about 5.5 and about 9.5.

18. The process of claim 10 wherein the injection of the salted aqueous suspension of functional animal muscle tissue protein composition is followed by vacuum tumbling.

19. The process of claim 1 wherein membrane lipids are separated from said aqueous basic solution of animal muscle tissue protein.

\* \* \* \* \*